United States Patent [19]

Sass et al.

[11] Patent Number: 5,074,941

[45] Date of Patent: Dec. 24, 1991

[54] ENHANCING BONDING AT METAL-CERAMIC INTERFACES

[75] Inventors: Stephen L. Sass; Rishi Raj, both of Ithaca, N.Y.; Fuh-Sheng Shieu, Midland, Mich.

[73] Assignee: Cornell Research Foundation, Inc., Ithaca, N.Y.

[21] Appl. No.: 624,989

[22] Filed: Dec. 10, 1990

[51] Int. Cl.$^5$ ............................................. B32B 31/24
[52] U.S. Cl. ..................................... 156/89; 228/120; 228/903
[58] Field of Search .................. 156/89; 228/120, 903; 264/60, 65

[56] References Cited

U.S. PATENT DOCUMENTS

| | | | |
|---|---|---|---|
| 2,800,710 | 7/1957 | Dunn | 228/122 |
| 3,531,853 | 10/1970 | Klomp | 228/193 |
| 3,753,774 | 8/1973 | Veloric | 437/89 |
| 3,994,430 | 11/1976 | Cusano et al. | 228/122 |
| 4,017,890 | 4/1977 | Howard et al. | 357/67 |
| 4,050,956 | 9/1977 | de Bruin et al. | 428/338 |
| 4,154,874 | 5/1979 | Howard et al. | 437/197 |
| 4,404,235 | 9/1983 | Tarug et al. | 437/245 |
| 4,470,537 | 9/1984 | Diem et al. | 228/193 |
| 4,542,073 | 9/1985 | Tanaka et al. | 428/446 |
| 4,591,401 | 5/1986 | Neidig et al. | 156/89 |
| 4,631,099 | 12/1986 | Ebata et al. | 156/89 |
| 4,720,401 | 1/1988 | Ho et al. | 427/250 |
| 4,763,828 | 8/1988 | Fukaya et al. | 228/124 |
| 4,824,008 | 4/1989 | Luszcz et al. | 228/121 |

OTHER PUBLICATIONS

Kennefick, C. M., et al., Acta Metall., vol. 37, No. 11, pp. 2947-2952, 1989.
Shieu, F. S., et al., Acta metall. mater., vol. 38, No. 11, pp. 2215-2224, 11/90.

*Primary Examiner*—James Lowe
*Assistant Examiner*—Christopher A. Fiorilla

[57] ABSTRACT

Metal-ceramic interfaces of enhanced strength are produced by positioning bodies of ceramic oxides and transition element metals or alloys containing such in abutting relationship, and heating in air at a temperature ranging from 500° C. to just below the melting point of the metal of the metal body to join said bodies and then subsequently heat treating said joined bodies in a reducing atmosphere at a temperature in the range of 300° C. to 1200° C. to form intermetallic compound layer at the interface.

4 Claims, No Drawings

5,074,941

ENHANCING BONDING AT METAL-CERAMIC INTERFACES

This invention was made at least in part with Government support under Office of Naval Research grant number N00014-88-K-0331. The Government has certain rights in the invention.

TECHNICAL FIELD

This invention is directed at bonding of metals and ceramics.

BACKGROUND OF THE INVENTION

In advanced technology it is necessary to join metal and ceramic components, e.g. in making metal- or ceramic-matrix composites, in electronic packaging or in vacuum sealing. Solid state diffusion bonding, in addition to bonding utilizing adhesive and by brazing, is a recent method for bonding metals to ceramics. Many attempts, including surface modification (U.S. Pat. Nos. 4,542,073 and 4,824,008), phase transformation (U.S. Pat. No. 4,470,538), and insertion of a layer of a mixture consisting of oxides and metals (U.S. Pat. Nos. 2,800,710 and 4,763,828), have been made to improve the bonding strength between metals and ceramics.

U.S. Pat. No. 4,050,956 describes a method of directly bonding metals and ceramics involving positioning these in abutting relationship and heating in air at a temperature ranging from about 800° C. to a maximum set by the melting point of the metal. This procedure produces strengths that range widely from very low values, such as 0.2 inch-pounds torque up to high values such as 108 inch-pounds of torque.

SUMMARY OF THE INVENTION

It is an object herein to provide a method of bonding a metal body to or with a ceramic body where bonding strengths of consistently high value are obtained.

This and other objects and advantages as are apparent from the description below are obtained by (a) positioning a body of a refractory oxide ceramic and a body of a metal in abutting relationship and heating at a temperature ranging from 500° C. to just below the melting point of said metal to join said bodies at an interface, and (b) heat treating said joined bodies in a reducing atmosphere at a temperature in the range of 300° C. to 1200° C. to form microscopically thin layer of intermetallic compound at the interface between the ceramic body and the metal. The refractory oxide ceramic is selected from the group consisting of oxides of elements (metals or semimetals) of Groups II, III, IV, VIB and VIII of the Periodic Table of Elements. The metal of the metal body is selected from the group consisting of transition element metals and alloys containing these, i.e. alloys containing at least one transition element metal. The metal or semimetal of the cation of the refractory oxide ceramic and the metal of the metal body are different from each other and capable of reacting to form an intermetallic compound.

In this way, torques of over 25 inch-pounds are typically obtained.

The term "intermetallic compound" is used herein to mean a compound formed between two different metals (including semimetals) having an ordered structure at the atomic scale between the two metals. In this case the compound is formed between the transition element metal of the metal body and the metal or semimetal of the cation from the ceramic oxide.

DETAILED DESCRIPTION

The refractory oxide ceramics for use herein include, for example, as Group II element oxides, BeO, MgO, CaO and BaO; as Group III element oxides, $Al_2O_3$, $Sc_2O_3$ and rare earth and actinide oxides such as $Y_2O_3$, $Ce_2O_3$, $ThO_2$ and $UO_2$; as Group IV element oxides, $SiO_2$, $ZrO_2$ and $TiO_2$; as a Group VIB element oxide, $Cr_2O_3$; as Group VIII element oxides, NiO, CoO, FeO, and $Ru_2O_3$. Mixtures of such oxides can be used as the refractory oxide ceramic.

The transition element metals for the metal body include, for example, titanium, iron, nickel, copper, palladium, platinum, zirconium, niobium, gold, silver, tungsten, and tantalum. The alloys containing these that are useful herein can contain amounts as low as 0.1 weight percent or less of the transition element metal. Such alloys should contain at least one transition element metal with the remainder being one or more other transition element metals or non-transition element metals.

The maximum temperature in step (a) is limited by the melting point of the metal component. Thus the maximum temperature is "just below the melting point of said component", that is sufficiently lower than such melting point that the bonding obtained is a solid state bonding process. The preferred range is from 50% to 90% of the melting point of the metal expressed in degrees Kelvin.

Step (a) is readily carried out over a time period ranging from 5 minutes to 24 hours, preferably 15 minutes to 1 hour.

The resulting metal-ceramic composite can have morphologies that range from laminates to continuous fibers to particulates.

For producing laminates, step (a) is preferably carried out under an axial pressure ranging from 0.05 MPa to 10 MPa, more preferably from 0.1 MPa to 1 MPa, using die pieces that are inert with respect to the treated components. Other morphologies of the metal-ceramic composite can require higher pressures of the type used in conventional powder consolidation ceramic processing.

We turn now to step (b).

The reducing atmosphere is defined as having an oxygen partial pressure below ambient. Preferably, the oxygen partial pressure ranges from $10^{-1}$ to $10^{-35}$ atmospheres, more preferably from $10^{-5}$ to $10^{-25}$ atmospheres. Such oxygen partial pressures are readily obtained by any of three well-known methods, namely, (1) mixtures of carbon monoxide and carbon dioxide or (2) hydrogen with controlled moisture content or (3) by mixing small amounts of oxygen with inert gases such as argon or helium. The oxygen partial pressure is readily determined by techniques well-known in the art, e.g., by measuring with a zirconia cell or by measurement of the dew point (in the case where the environment is hydrogen).

The temperature during heat treating in step (b) preferably ranges from 400° C. to 600° C.

At a given temperature in step (b), lowering oxygen partial pressure will accelerate the formation of the intermetallic layer.

The heat treating in step (b) is readily carried out over a time period of at least 5 minutes, preferably at least 30 minutes. The upper limit on time of heat treatment usually does not affect the result obtained, but from a practical standpoint, times of less than 100 hours are adequate.

The term "heat treating" is used herein to mean placing the composite in a controlled atmosphere at a specified temperature without the application of uniaxial pressure.

The microstructure at the interface between the metal and ceramic in the composite obtained in step (b) comprises a layer of intermetallic compound of metal from the transition metal of the metal component and the metal or semimetal of the cation from the ceramic oxide, said layer having a thickness of from 1 nm to 1000 nm.

The invention is illustrated by the following specific experiment.

EXAMPLE

A ceramic component was produced by growing an NiO film on the surface of a cleaved MgO crystal by reacting $NiBr_2$ and water vapor at a pressure of 25 torr. This was carried out by heating solid $NiBr_2$ at 710° C. to vaporize it in the presence of the water vapor. This method is described in Cech, R.E. et al, Trans. Am. Soc. Metals 51, 150 (1959).

In a step (a), the nickel oxide film so grown was bonded to a platinum plate of dimensions 10 mm×30 mm×1 mm by positioning the MgO crystal with NiO film thereon in contact with the platinum plate and applying a uniaxial pressure with a hydraulic piston at a pressure of 0.5 MPa for 10 hours at 1200° C. in air. The MgO was then dissolved in a 15% $H_2SO_4$-$H_2O$ solution at a temperature of 70° C., leaving a composite consisting of the platinum plate and a layer of NiO with a thickness of approximately 5 micrometers. The shear strength of the nickel oxide platinum bond was measured by the periodic cracking technique in which the metal is plastically deformed in uniaxial tension and consequential cracking in the nickel oxide film is characterized by measuring the strain required for the onset of said cracking and by measuring the spacing of the cracks that develop at large plastic deformation and estimating the shear strength from these two measurements. This technique is more completely described in Agrawal, D.C., et al, Acta Metall. 37, 1265 (1989). The shear strengths obtained by this procedure in four samples ranged from 224 to 446 MPa.

In a step (b), two samples prepared the same as in step (a) above, were heat treated in a laboratory furnace in an atmosphere consisting of 0.1% CO and 99.9% $CO_2$ at a temperature of 500° C. for periods of 12 and 36 hours. This corresponded to heat treating at an oxygen partial pressure of $10^{-23}$ atmospheres. The shear strengths of these specimens as determined in said periodic cracking technique ranged from 1360 to 2040 MPa which is at least 4 times greater than obtained without the heat treatment.

The microstructure at the interfaces in specimens from step (b) was distinguished from that at the interfaces in the specimens from step (a) by the presence of an intermetallic compound (NiPt) layer of thickness ranging from 10 to 65 nm, as measured using a transmission election microscope.

Intermetallic compound layer of thickness as small as 1 nm provides similar strengthening.

Similar strengthening results can be obtained using lower temperatures than 500° C. by using lower oxygen partial pressures.

Similar consistently high strengths are obtained when alumina platinum composite prepared by pressing in air for 16 hours at 835° C. in a step (a) is heat treated in a step (b) at 800° C. at oxygen partial pressure of $10^{-25}$ atmosphere for 2 hours.

Similar consistently high strengths are obtained for silver titanium alloy (1% titanium) bonded to alumina substrate by pressing in air at 700° C. for 10 hours in a step (a) followed by heat treating in a step (b) at 500° C. at oxygen partial pressure of $10^{-20}$ atmospheres for 30 minutes.

Variations will be obvious to those skilled in the art. Thus, the scope of the invention is defined by the claims.

What is claimed is:

1. A method of bonding a body of a refractory oxide ceramic selected from the group consisting of oxides of elements of Groups II, III, IV, VIB and VIII of the Periodic Table of Elements and mixtures of such oxides and a body of a metal selected from the group consisting of transition element metals and alloys containing them wherein said element of said ceramic is different from said metal, said method comprising the steps of
    (a) positioning said bodies in abutting relationship and heating at a temperature ranging from 500° C. to just below the melting point of the metal component in air to join said bodies at an interface by solid state bonding,
    (b) heat treating said joined bodies in a reducing atmosphere at a temperature in the range of 300° to 1200° C. to form intermetallic compound layer between said element from the ceramic oxide and said transition element metal at the interface.

2. The method of claim 1 wherein the reducing atmosphere is defined by an oxygen partial pressure ranging from $10^{-1}$ to $10^{-35}$ atmospheres.

3. The method of claim 2 wherein in step (b) the temperature ranges from 400° C. to 600° C. and the oxygen partial pressure ranges from $10^{-5}$ to $10^{-25}$ atmospheres.

4. The method of claim 3 wherein in step (b) heat treating is carried out for a time period of at least 5 minutes.

* * * * *